Oct. 21, 1924.

L. D. SOUBIER

GLASS FEEDER

Filed April 6, 1922

1,512,374

INVENTOR
L. D. SOUBIER
By
J. F. Rule.
HIS ATTORNEY

Patented Oct. 21, 1924.

1,512,374

UNITED STATES PATENT OFFICE.

LEONARD D. SOUBIER, OF TOLEDO, OHIO, ASSIGNOR TO THE OWENS BOTTLE COMPANY, OF TOLEDO, OHIO, A CORPORATION OF OHIO.

GLASS FEEDER.

Application filed April 6, 1922. Serial No. 549,979.

*To all whom it may concern:*

Be it known that I, LEONARD D. SOUBIER, a citizen of the United States, residing at Toledo, in the county of Lucas and State of Ohio, have invented new and useful Improvements in Glass Feeders, of which the following is a specification.

My invention relates to glass feeders of the type in which a vertically reciprocating plug or plunger automatically controls the periodic discharge of gobs or charges of molten glass from an outlet in the floor of a container. It is customary to make such plugs or plungers of a refractory material such as fire clay. As the plunger descends, it exerts an expelling force on the glass, thereby assisting in forcing out a compact mass or gob of glass. The suspended mass is then severed and the plunger moved upward. As the glass adheres to the plunger, the movement of the glass through the orifice is retarded or reversed by the upward movement of the plunger.

A feature of the present invention consists in the provision of a plunger made of graphitic material to which the glass will not adhere and which is preferably made of a shape to more positively control the expulsion of the glass, at the same time securing a much smoother and less disturbing action of the plunger in the glass and materially reducing the amount of power required to operate the plunger. The plunger tip may be formed of fire clay or other material to which glass will adhere and thereby produce the desired retardation or upward movement and control of the glass as the plunger is withdrawn. The walls of the orifice may also be made of material to which the glass will not adhere and thereby assist in obtaining an efficient operation of the feeder.

Other objects of the invention will appear hereinafter.

Figure 1:
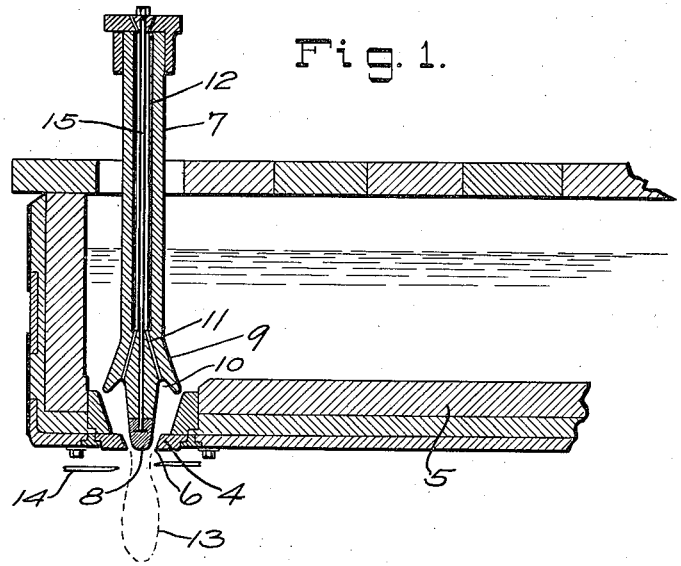
Figure 1 is a sectional elevation of apparatus constructed in accordance with my invention.
Figure 2:
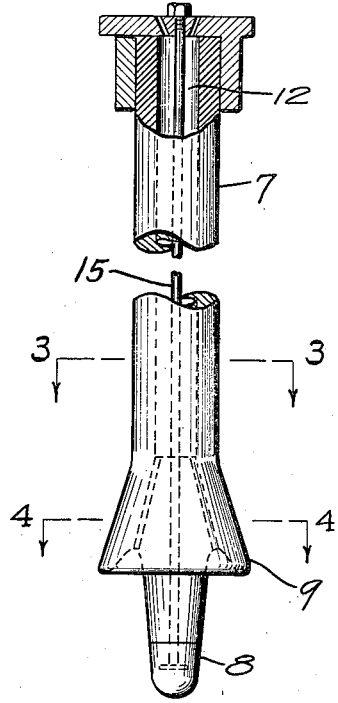
Figure 2 is a part sectional elevation of the plunger.
Figure 3:
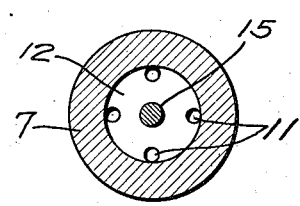
Figure 4:
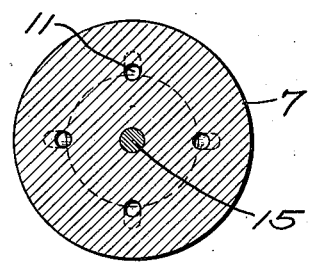

Figures 3 and 4 are sections respectively at the lines 3—3 and 4—4 on Figure 2.

Molten glass is supplied to a receptacle 5 which may be the usual forehearth or boot extension of the main furnace. The glass issues through an outlet orifice 6 in a bushing 4 removably mounted in the floor of the boot. The discharge of glass is controlled by a periodically reciprocating plug or plunger 7 actuated by suitable mechanism (not shown). The body of this plunger is made of a material to which the molten glass will not adhere under working conditions, as it does to fire clay or materials of which such plungers are ordinarily made.

I preferably form the plunger of a graphitic material comprising a mixture of clay and graphite. The bushing 4 is also preferably made of the same material or a material having similar non-adherent properties. The lower end or tip 8 is made of fire clay or other refractory material to which the glass tenaciously adheres. This tip, as shown, is secured in position by a rod 15 extending lengthwise through the body 7 centrally thereof, the lower end of said rod being anchored in the tip 8.

The plunger is formed near its lower end with a flared portion 9 frusto-conical in shape and providing at its lower end a surface which, as the plunger descends, will exert a positive expelling action on the glass. The lower surface of the head 9 may be undercut or hollowed out as at 10 to make the expelling action more positive. Air channels 11 extend upward through the head 9 to the chamber 12 which extends lengthwise of the plug and is open to the outside air. These air channels 11 are sufficiently restricted to prevent the entrance of glass, but permit the escape of air which might be otherwise entrapped in the issuing glass.

In operation, the plunger as it descends, exerts a positive expelling action on the glass whereby a mass or gob 13 is extruded and suspended from the plunger tip. This gob is severed by shears 14 and the plug withdrawn. As the plug moves upward, the glass adheres to the tip 8 so that the downward movement of the glass through the outlet is retarded or the protruding stub of glass remaining after the gob has been severed may be drawn upward through the outlet.

Modifications may be resorted to within the spirit and scope of my invention.

What I claim is:

1. The combination of a container for molten glass having an outlet orifice in the bottom thereof, and means to control the discharge of glass through the outlet comprising a body of graphitic material.

2. The combination of a container for molten glass having an outlet orifice in the bottom thereof, and means to control the discharge of glass through the outlet comprising a body projecting into the glass, and consisting of material to which the glass will not adhere.

3. The combination of a container for molten glass having an outlet orifice in the bottom thereof, and means to control the discharge of glass through the outlet comprising a body projecting into the glass, and having a surface to which the glass will not adhere.

4. The combination of a container for molten glass having an outlet orifice in the bottom thereof, and means to control the discharge of glass through the outlet comprising a body projecting into the glass, and consisting of a material to which the glass will not adhere, said body having a tip formed of refractory material to which the molten glass adheres.

5. The combination of a container for molten glass having an outlet orifice in the bottom thereof, and means to control the discharge of glass through the outlet comprising a body projecting into the glass, and having a surface to which the glass will not adhere, the lower end of said body being provided with a surface to which the molten glass will adhere.

6. In glass feeding apparatus, the combination of a container for molten glass provided with an outlet opening extending through the floor thereof, a controlling device projecting downwardly into the glass above said opening, said device having a lateral enlargement or projection operable to force a portion of molten glass downward through the outlet as said device descends, the lower surface of said enlargement consisting of a material to which the molten glass will not adhere.

7. In glass feeding apparatus, the combination of a container for molten glass provided with an outlet opening extending through the floor thereof, a controlling device projecting downwardly into the glass above said opening, said device terminating in a tip arranged to enter the outlet orifice and comprising an annular enlargement above said tip, the surface of said enlargement consisting of material to which the glass will not adhere.

8. In glass feeding apparatus, the combination of a container for molten glass provided with an outlet opening extending through the floor thereof, a controlling device projecting downwardly into the glass above said opening, said device terminating in a tip arranged to enter the outlet orifice and comprising an annular enlargement above said tip, said tip formed of material to which the molten glass will tenaciously adhere and the body of said device having a surface to which the glass will not adhere.

9. As an article of manufacture, a plunger comprising a substantially cylindrical body outwardly flared adjacent one end to form a frusto-conical enlargement and provided with a tip extending beyond and of substantially smaller diameter than said enlargement, said plunger having a surface of refractory material which will withstand the heat of molten glass and to which the glass will not adhere.

10. As an article of manufacture, a plunger comprising a substantially cylindrical body outwardly flared adjacent one end to form a frusto-conical enlargement and provided with a tip extending beyond and of substantially smaller diameter than said enlargement, said plunger having a surface of refractory material which will withstand the heat of molten glass and to which the glass will not adhere, said tip formed of refractory material to which the molten glass will adhere when the tip is heated thereby.

11. In glass feeding apparatus, the combination of a container for molten glass having an outlet opening extending through the bottom thereof, a regulating plunger projecting downward into the glass above said outlet, and adapted to be reciprocated vertically to control the discharge of glass, said plunger having a substantially cylindrical body with a downwardly and outwardly flared enlargement forming at its lower end an annular concave surface surrounding the body of the plunger, the latter being formed with air channels extending upwardly from said surface through the body of the plunger and in communication with the outside air, said surface being formed of a material to which the glass will not adhere, the plunger having a tip projected downward below said surface and formed of refractory material to which the glass will adhere when the tip is heated thereby.

12. The combination of a container for molten glass having an outlet orifice in the bottom thereof, the walls of the orifice being formed of graphitic material, and means to control the discharge of glass through the outlet comprising a body of graphitic material.

13. The combination of a container for molten glass having an outlet orifice in the bottom thereof, the walls of the orifice consisting of material to which the glass will not adhere, and means to control the discharge of glass through the outlet comprising a body projecting into the glass, and consisting of material to which the glass will not adhere.

14. The combination of a container for molten glass having an outlet orifice in the bottom thereof, the walls of the orifice consisting of material to which the glass will not adhere, and means to control the discharge of glass through the outlet comprising a body projecting into the glass, and consisting of material to which the glass will not adhere, said body having a tip formed of refractory material to which the molten glass adheres.

15. A container for molten glass provided with an outlet opening through which the glass discharges, the walls of said outlet being formed of a material to which the molten glass will not adhere.

16. A container for molten glass provided with an outlet opening through which the glass discharges, the walls of said outlet being formed of a material to which the molten glass will not adhere, and a regulator operating periodically within the glass to control the discharge through said orifice.

17. A container for molten glass provided with an outlet opening through which the glass discharges, the walls of said outlet being formed of a material to which the molten glass will not adhere, and automatic means to effect a periodic discharge of glass through the orifice.

18. A container for molten glass provided with an outlet opening in the bottom thereof through which the glass issues, the walls of said opening being formed of a material to which the glass will not adhere, a regulator within the glass over said opening comprising material to which the glass will adhere, and automatic means to periodically reciprocate said regulator vertically.

Signed at Toledo, in the county of Lucas and State of Ohio, this 3d day of April, 1922,

LEONARD D. SOUBIER.